W. V. TURNER.
STRAIGHT AIR EMERGENCY BRAKE.
APPLICATION FILED MAY 25, 1917.
1,281,436.
Patented Oct. 15, 1918.
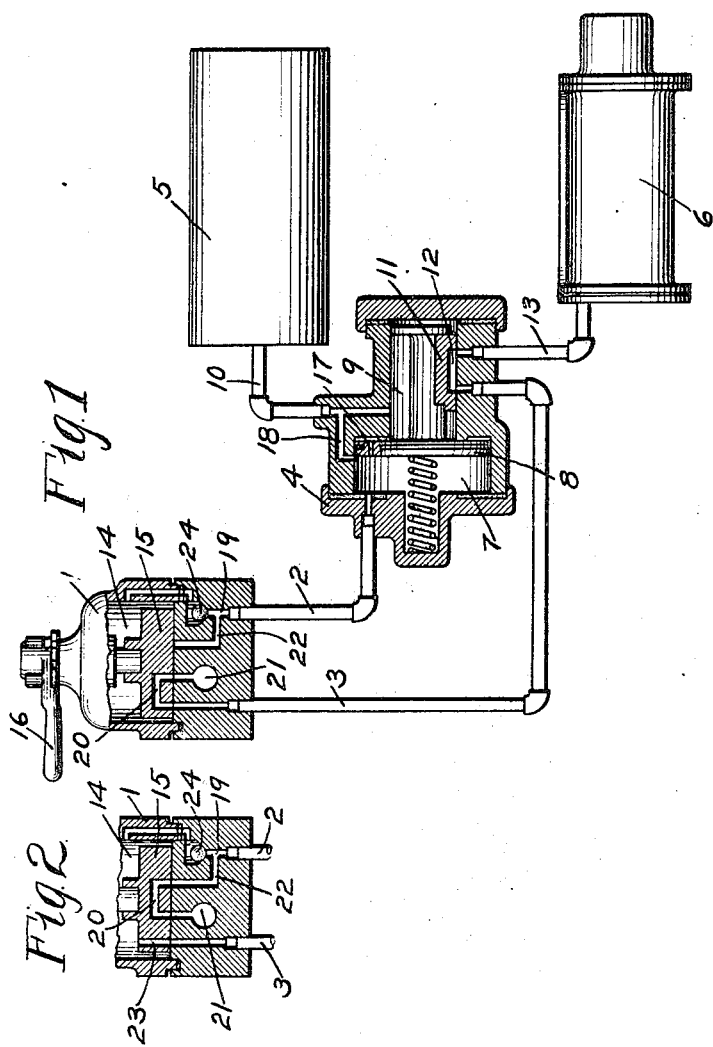
INVENTOR
Walter V. Turner
by Wm. M. Cady
Att'y.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

STRAIGHT-AIR EMERGENCY-BRAKE.

1,281,436.　　　Specification of Letters Patent.　　Patented Oct. 15, 1918.

Application filed May 25, 1917. Serial No. 170,875.

*To all whom it may concern:*

Be it known that I, WALTER V. TURNER, a citizen of the United States, residing at Wilkinsburg, in the county of Allegheny and State of Pennsylvania, have invented new and useful Improvements in Straight-Air Emergency-Brakes, of which the following is a specification.

This invention relates to fluid pressure brakes, and more particularly to a straight air emergency brake.

It has heretofore been proposed to provide a straight air emergency brake equipment in which the emergency brake pipe is adapted to supply fluid from the main reservoir through the emergency valve device to the rotary valve chamber of the brake valve for making straight air applications of the brakes.

When a reduction in brake pipe pressure is made by manipulation of the brake valve, the brake pipe is connected to the atmosphere and if there should happen to be any fluid pressure in the straight air pipe at this time, due to a previous application of the brakes, this pressure would tend to blow the rotary valve of the brake valve off its seat. In order to prevent this, it has been proposed to provide a port in the rotary valve, which in emergency position will connect the straight air pipe with the rotary valve chamber, and a connection from the rotary valve chamber to the brake pipe, so that the pressure in the straight air pipe will be relieved and thus prevent the lifting of the valve from its seat.

If, however, the emergency valve device should fail to move in response to the reduction in brake pipe pressure when the brake valve is moved to emergency position, after a straight air application has been made, then fluid from the brake cylinder can escape to the atmosphere through the straight air pipe and the brake valve.

The principal object of my invention is to obviate the above difficulty.

In the accompanying drawing, Figure 1 is a diagrammatic view, partly in section of a straight air emergency brake equipment embodying my invention; and Fig. 2 a sectional view of the brake valve in emergency application position.

As shown in Fig. 1 of the drawing, the equipment may comprise a brake valve 1, an emergency brake pipe 2, a straight air pipe 3, an emergency valve device 4, a main reservoir 5, and a brake cylinder 6.

The emergency valve device 4 may comprise a casing, having a piston chamber 7 connected to the brake pipe 2 and containing piston 8 and a valve chamber 9 connected by pipe 10 to main reservoir 5 and containing a slide valve 11, adapted in release position to connect the straight air pipe 3 through cavity 12 with brake cylinder pipe 13.

The brake valve device 1 may comprise a casing, having a rotary valve chamber 14 containing a rotary valve 15 adapted to be operated by a handle 16.

In operation, fluid is supplied from the main reservoir 5 to valve chamber 9, and thence through port 17 in piston 8 to piston chamber 7, fluid also flowing from the main reservoir through port 18 to piston chamber 7.

From piston chamber 7 fluid flows through the emergency brake pipe 2 to the brake valve 1 and thence through a constantly open passage 19 to the rotary valve chamber 14.

In release position, as shown in Fig. 1 of the drawing, the straight air pipe 3 is connected by cavity 20 in the rotary valve 15 with an exhaust port 21, so that the brake cylinder is now connected to the exhaust.

In order to effect a straight air application of the brakes, the brake valve device 1 is turned to straight air application position, in which a through port in the rotary valve 15 registers with straight air pipe 3. Fluid is then supplied to the brake cylinder 6 from the main reservoir, through the emergency brake pipe 2, and the rotary valve chamber 14, to the straight air pipe 3 and thence through cavity 12 in the emergency slide valve 11 to the brake cylinder pipe 13.

An emergency application of the brakes may be made by turning the brake valve to emergency position, as shown in Fig. 2 of the drawing, in which the brake pipe 2 is connected through passage 22 and cavity 20 in the rotary valve with exhaust port 21. A reduction in brake pipe pressure is then effected and the emergency piston 8 is operated to shift slide valve 11 and permit fluid to be supplied from valve chamber 9 and the main reservoir 5 directly to the brake cylinder 6.

In emergency position, a through port 23 in the rotary valve 15 registers with straight air pipe 3, so that any pressure in the straight air pipe can equalize into the rotary valve chamber.

According to my invention, a check valve 24 is interposed in the passage 19, so that in case the emergency valve piston fails to move to emergency position upon a reduction in brake pipe pressure, if a straight air application of the brakes has previously been made, fluid is prevented from escaping to the exhaust port 21.

At the same time, the rotary valve 15 is prevented from lifting from its seat, since fluid in the straight air pipe can flow through the port 23 in the rotary valve 15 to the rotary valve chamber 14 and thus maintain fluid pressure in the rotary valve chamber corresponding with that in the straight air pipe, so that there will be no unbalanced pressure tending to lift the rotary valve from its seat.

Having now described my invention, what I claim as new and desire to secure by Letters Patent, is:

1. In a fluid pressure brake, the combination with a brake pipe, of a brake valve device having a rotary valve chamber constantly connected to the brake pipe and adapted to be charged from the brake pipe, and a check valve for preventing back flow from the chamber to the brake pipe.

2. In a fluid pressure brake, the combination with a brake pipe, of a brake valve device having a rotary valve chamber and a constantly open passage for supplying fluid from the brake pipe to the rotary valve chamber and a check valve for preventing back flow from the rotary valve chamber to the brake pipe.

3. In a fluid pressure brake, the combination with a brake pipe, an emergency valve device, operated upon a reduction in brake pipe pressure for effecting an application of the brakes, a brake valve, and a source of fluid under pressure, fluid from which is supplied through the emergency valve device and the brake pipe to the rotary valve chamber of the brake valve, of a check valve for preventing back flow from the rotary valve chamber to the brake pipe.

4. In a fluid pressure brake, the combination with a brake pipe, a straight air pipe, an emergency valve device, operated upon a reduction in brake pipe pressure for effecting an application of the brakes, of a source of fluid under pressure, a brake valve device for supplying fluid from the source of fluid under pressure through the brake pipe to the straight air pipe, and a check valve for preventing back flow from the brake valve to the brake pipe.

5. In a fluid pressure brake, the combination with a brake pipe, a straight air pipe, an emergency valve device, operated upon a reduction in brake pipe pressure for effecting an application of the brakes, of a source of fluid under pressure, a brake valve device having a position for reducing the brake pipe pressure, in which the rotary valve chamber of the brake valve is open to the straight air pipe, and a check valve for preventing back flow from the rotary valve chamber to the brake pipe.

In testimony whereof I have hereunto set my hand.

WALTER V. TURNER.